United States Patent

Janosi

[15] 3,646,831
[45] Mar. 7, 1972

[54] VARIABLE RATIO BRAKE PEDAL

[72] Inventor: Francis L. Janosi, Dearborn Heights, Mich.

[73] Assignee: Ford Motor Company, Dearborn, Mich.

[22] Filed: July 6, 1970

[21] Appl. No.: 52,234

[52] U.S. Cl. .............................................................74/518
[51] Int. Cl. .........................................................G05g 1/04
[58] Field of Search ............................................74/518, 516

[56] References Cited

UNITED STATES PATENTS

| | | | |
|---|---|---|---|
| 1,928,083 | 1933 | Warren | 74/516 |
| 1,808,121 | 1931 | Smith | 74/516 X |
| 3,099,169 | 1963 | Nilsson | 74/518 |
| 542,088 | 1895 | Masterman | 74/518 |

FOREIGN PATENTS OR APPLICATIONS 282,920   1927   Great Britain.............................74/518

Primary Examiner—William F. O'Dea
Assistant Examiner—P. D. Ferguson
Attorney—John R. Faulkner and Clifford L. Sadler

[57] ABSTRACT

A variable ratio brake pedal assembly including a foot-operated pedal lever, a brake-applying means and an intermediate lever interposed between the pedal lever and the brake-applying device. The intermediate lever has cam surfaces that engage both the brake-applying device and the foot-operated pedal lever whereby a change in mechanical advantage ratio occurs as force is transmitted from the pedal lever through the intermediate lever to the brake-applying device when the pedal lever pivots and the intermediate lever is angularly displaced.

3 Claims, 2 Drawing Figures

PATENTED MAR 7 1972 3,646,831

INVENTOR
FRANCIS L. JANOSI
BY John R. Faulkner
Clifford L. Sadler
ATTORNEYS

VARIABLE RATIO BRAKE PEDAL

BACKGROUND OF THE INVENTION

It has become desirable in recent years to shorten the stroke of movement of the pedal that is used for applying the brakes of a motor vehicle. A brake pedal with a short stroke has the advantage that the brakes can be applied more quickly. A shorter stroke of movement of the pedal will allow the brake pedal to be placed more on a plane with the accelerator pedal for the vehicle so that the vehicle operator can shift his foot quickly from the accelerator to the brake pedal thereby cutting down reaction time during acceleration and braking.

In the brake system of the average motor vehicle there is a certain amount of lost motion that occurs in moving the brakeshoes into frictional engagement with the brakedrum with the result that a part of the brake pedal movement is used in merely taking up the normal slack in the brake system. Normally relatively low efforts are required by the vehicle operator to move the brake pedal through this initial phase prior to the actual brake application.

It is, therefore, an object of this invention to provide a lever system for applying the brakes of a vehicle wherein the lever system effects a rapid movement of the brakeshoe assemblies into engagement with the brakedrum on a relatively short stroke of the brake pedal and at a ratio of mechanical advantage that is lower than is desired for high-pressure brake application.

It is also an object of the invention to provide a brake-applying lever system that accomplishes the foregoing object and wherein the mechanical advantage ratio for effecting high-pressure application of the brakes is increased during the time the brakeshoe assemblies are being moved into engagement with the brakedrum so that when the shoes engage the drums there will be provided a higher mechanical advantage to secure a high-pressure brake application with a lower effort requirement on the part of the operator of the vehicle.

BRIEF SUMMARY OF THE DISCLOSURE

In the presently preferred embodiment of this invention a brake pedal is suspended at its upper end and forms a second class lever. An intermediate lever of the first class engages the brake pedal and transfers forces therefrom to a brake actuator such as the input push rod of a brake master cylinder. The intermediate lever has a cam surface that engages a portion of the pedal lever. The intermediate lever also has a cam surface that engages the master cylinder push rod.

The cam surfaces of the intermediate lever are constructed and arranged whereby initial movement of the brake pedal will transmit a force through the intermediate lever to the push rod at a moderate mechanical advantage ratio. As the angular displacement of the brake pedal increases there will be a corresponding increase in mechanical advantage ratio. The increase in ratio occurs as the pedal portion moves along the cam surface of the intermediate lever and similarly as the second cam surface of the intermediate lever moves in engagement with the push rod of the master cylinder.

The result of this construction is that initial brake pedal movement will cause initial displacement of brake system components at a low mechanical advantage ratio and then at an increased mechanical advantage ratio (with a corresponding increase in brake applying force) when the slack in the system has been taken up and the shoes are in engagement with the brakedrums.

BRIEF DESCRIPTION OF THE DRAWINGS

The many objects and advantages of the present invention will become apparent from the following detailed description and the accompanying drawings wherein a preferred form of the invention is clearly shown.

In the drawings.

DETAILED DESCRIPTION OF A PREFERRED EMBODIMENT

Figure 1:
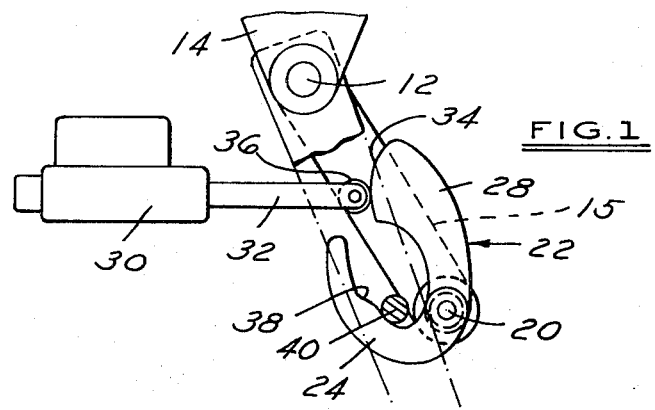
FIG. 1 discloses a side elevational view of a brake-pedal system constructed in accordance with this invention, the lever being shown in the normal brake-released position

Referring now to the drawings, where the presently preferred embodiment of this invention is shown, FIG. 1 discloses a brake pedal 10 that is pivotally supported at its upper end by a stationary pivot pin 12. The pivot pin 12 is supported at one end by stationary vehicle structure 14 and at its other end by structure 15. The lower end of the pedal 10 has a pedal pad 16 secured thereto for engagement by the foot of a vehicle operator. The pedal 10 is shown in its retracted or "at rest" position.

Figure 2:
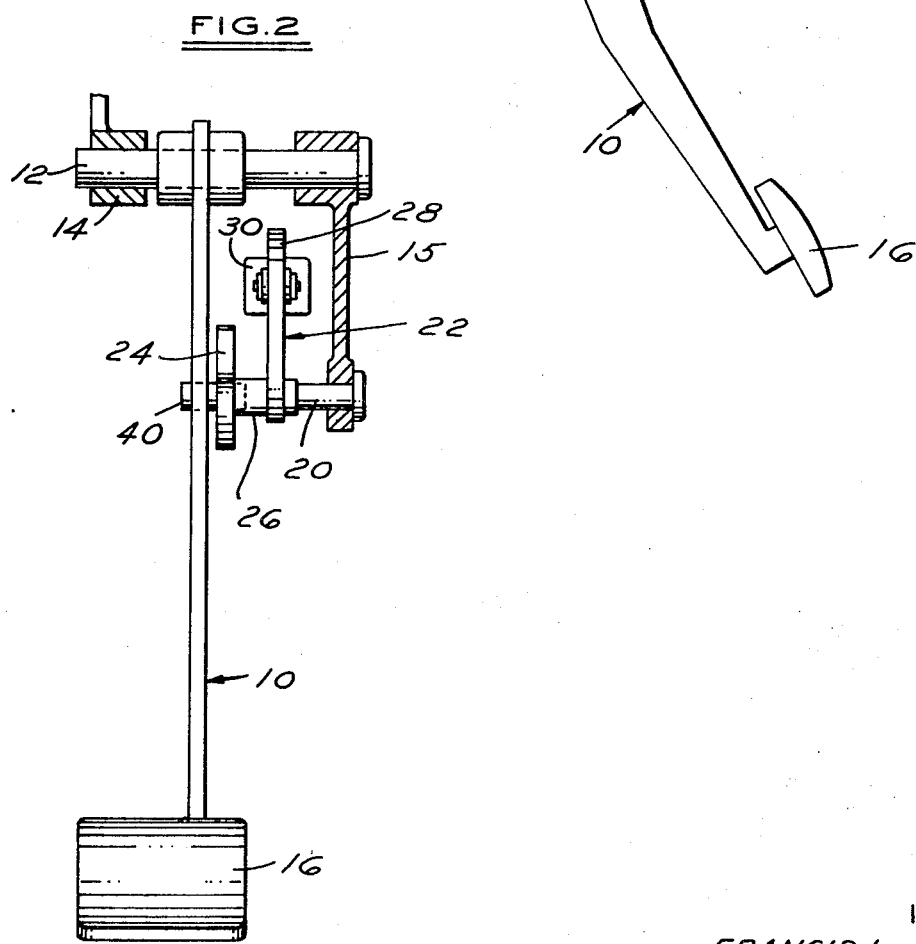
FIG. 2 is a rear elevational view of the brake system of FIG. 1.

A cantilever pivot pin 20 has its right end (as seen in FIG. 2) secured to the support structure 15. An intermediate first class lever 22 is pivotally supported on the pin 20. The lever 22 comprises a first arm 24 that is secured to a hub portion 26 and a second arm 28 also secured to the hub 26. The hub 26 is pivotally supported on the pivot pin 20.

A brake master cylinder 30 is supported on the vehicle body and has a push rod 32 extending therefrom. The push rod 32 is constructed to be translated along a linear path with respect to the master cylinder 30 for application of the brakes of the vehicle.

The lever 22 functions as an intermediate motion and force-transmitting device interposed between the brake lever 10 and the master cylinder push rod 32.

The end of the arm 28 of intermediate lever 22 has a cam surface 34 that is engaged by a roller 36 on the end of the push rod 32. The roller functions as a cam follower.

Arm 24 of intermediate lever 22 has a cam surface 38. The brake pedal 10 is provided with a pin or dowel 40 which is positioned to engage the cam surface 38.

OPERATION

Referring to FIG. 1, when the operator of the vehicle presses the pedal pad 16 the lever 10 will swing clockwise above the pivot pin 12. In response to this movement, the dowel 40, being in engagement with the cam surface 38 of lever 22, will cause lever 22 to pivot about the pin 20. Because the lever arms 24, 28 and hub 26 are rigidly interconnected to form a one-piece unit 22, angular displacement of lever arm 24 caused by movement of pedal 10 will cause a corresponding angular displacement of lever arm 28. Therefore, intermediate lever 22 will move counterclockwise in response to the clockwise movement of the pedal 10. The end cam surface 34 of lever 28 will be displaced in a fashion to move the push rod 32 to the left (in FIG. 1) thereby causing actuation of the brake system.

In a conventional manner, when the push rod 32 is moved to the left pressure is developed in the brake lines and the wheel cylinders of the vehicle's hydraulic brake system. Initial brake line pressure will move the brakeshoes from their retracted position against the force of the retractor springs in the wheel brake assemblies into engagement with the brake drums. A subsequent buildup in hydraulic line pressure will cause the brakeshoes to engage the drums with sufficient force to develop frictional resistance to the continued rotation of the drums.

The cam surfaces 34 and 38 are contoured so that a relatively low mechanical advantage ratio exists for initial movement of the brake pedal 10. This low mechanical advantage ratio is effective for taking up slack in the brake system and for moving the brakeshoes from their retracted position into contact with the brakedrum. The cam surfaces 34 and 38 are contoured so that after the initial movement of the brake pedal 10 there will be a substantial increase in mechanical advantage ratio whereby the same force applied against the pedal pad 16 by the vehicle operator will result in an increased force moving the push rod 32 into the master cylinder 30. This results in an increase in brakeshoe-applying force.

In summary, the brake system of the present invention provides an arrangement whereby initial movement of the brake pedal 10 will be at a low mechanical advantage ratio whereby a low or nominal force will produce substantial displacement in the brake system for taking up slack and subsequent pedal movement which will be at a higher ratio whereby an increase in brakeshoe-applying force will occur for the same force on the pedal pad 16.

The foregoing description presents the presently preferred embodiment of this invention. Modifications and alterations may occur to those skilled in the art which will come within the scope and spirit of the following claims.

I claim:

1. A variable ratio brake-applying device comprising a foot-operated pedal lever pivotally supported on vehicle support structure for angular displacement, said pedal lever being displaceable from a retracted position to a brake-applied position, said brake-applying device including a brake master cylinder means and a linearly movable master cylinder push rod means, intermediate lever means pivotally supported on said vehicle support structure adjacent said pedal lever, said intermediate lever means having first and second contoured cam surfaces, said pedal lever having a cam follower directly engaging said first cam surface, said master cylinder push rod means having a cam follower directly engaging said second cam surface, said intermediate lever means being constructed for translating angular displacement of said pedal lever to linear displacement of said master cylinder push rod means, said intermediate lever means being constructed to provide a progressive increase in mechanical advantage ratio of said brake-applying device in response to the angular displacement of said pedal lever as said pedal lever is displaced from its retracted position to its brake-applied position.

2. A variable ratio brake-applying device comprising a foot-operated pedal lever pivotally supported on vehicle support structure for angular displacement, said pedal lever being displaceable from a retracted position to a brake applied position, said brake-applying device including a brake master cylinder and a linearly movable master cylinder push rod, intermediate lever means pivotally supported on said vehicle support structure adjacent the midportion of said pedal lever, said intermediate lever means having a pair of spaced leg portions and being of generally U-shape in side-elevational view, one of said leg portions having a first contoured cam surface, the other of said leg portions having a second contoured cam surface, said intermediate lever means being pivotally supported intermediate said leg portions, said pedal lever having a cam follower engaging said first cam surface, said master cylinder push rod having a cam follower engaging said second cam surface, said intermediate lever means being constructed for translating angular displacement of said pedal lever to linear displacement of said master cylinder push rod, said intermediate lever means being constructed to provide a progressive increase in mechanical advantage ratio of said brake assembly in response to the angular displacement of said pedal lever as said pedal lever is displaced from its retracted position to its brake-applied position.

3. A variable ratio brake-applying device comprising a foot-operated pedal lever pivotally supported on vehicle support structure for angular displacement, said pedal lever being displaceable from a retracted position to a brake-applied position, said brake-applying device including a brake master cylinder and a linearly movable master cylinder push rod, intermediate lever means pivotally supported on said vehicle support structure adjacent the midportion of said pedal lever, said intermediate lever means having a pair of axially spaced leg portions, one of said leg portions having a first contoured cam surface, the other of said leg portions having a second contoured cam surface, said intermediate lever means being pivotally supported intermediate said leg portions, said pedal lever having a cam follower engaging said first cam surface, said master cylinder push rod having a cam follower engaging said second cam surface, said intermediate lever means being constructed for translating angular displacement of said pedal lever to linear displacement of said master cylinder push rod, said intermediate lever means being constructed to provide a progressive increase in mechanical advantage ratio of said brake-applying device in response to the angular displacement of said pedal lever as said pedal lever is displaced from its retracted position to its brake-applied position.

* * * * *